tent Office 2,803,672
Patented Aug. 20, 1957

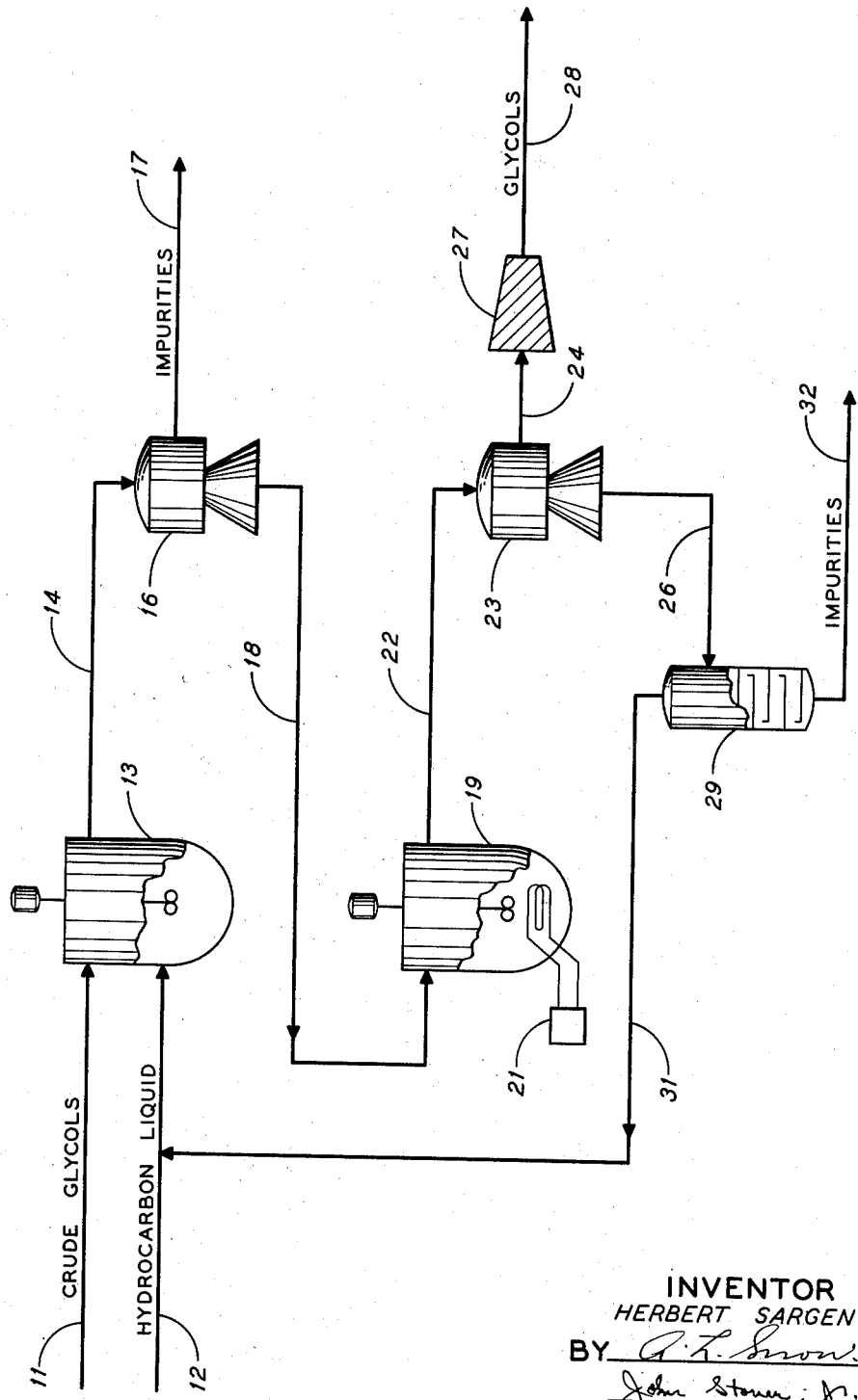

2,803,672

PURIFICATION OF GLYCOLS PREPARED BY HYDROXYLATION OF CRACKED WAX OLEFINS

Herbert Sargent, San Anselmo, Calif., assignor to California Research Corporation, San Francisco, Calif., a corporation of Delaware Application March 23, 1953, Serial No. 344,071

10 Claims. (Cl. 260—637)

This invention relates to the production of glycols. More particularly, the invention relates to the production of improved glycols from crude glycols prepared by the hydroxylation of high molecular weight cracked petroleum wax olefins.

High molecular weight glycols are valuable intermediates in the production of superior surface-active agents. Their sulfuric esters, upon conversion to the corresponding water-soluble salts, have excellent wetting and detergent properties.

High molecular weight glycols are generally prepared by the hydroxylation of high molecular weight olefins. (See, for example, the disclosures of U. S. Patent No. 2,138,917 to Grun and U. S. Patent No. 2,595,341 to Dinerstein et al. and also the article by Swern et al. appearing in the Journal of the American Chemical Society, vol. 68, at pages 1504 and 1505.) Sources of high molecular weight olefins suitable for hydroxylation include dehydrated high molecular weight primary alcohols and dehydrohalogenated high molecular weight alkyl halides. High molecular weight olefins from cracked petroleum waxes may also be hydroxylated. Such olefins have the advantage of being readily available and economical to use. However, the glycols obtained from them give surface-active agents which are less effective than those derived from other sources of olefins.

It is, therefore, an object of this invention to provide a process for producing glycols suitable for conversion to superior surface-active agents by reaction with sulfuric acid from crude glycol mixtures prepared by the hydroxylation of high molecular weight cracked petroleum wax olefins.

A further object of the invention is the provision of a continuous process for the production of glycols suitable for conversion to superior surface-active agents by reaction with sulfuric acid from crude glycols prepared by the hydroxylation of high molecular weight cracked petroleum wax olefins.

Still further objects of the invention will be apparent from the description and examples given hereinafter.

It has now been found that glycols suitable for conversion to superior surface-active agents by reaction with sulfuric acid may be produced from crude glycols prepared by the hydroxylation of high molecular weight cracked petroleum wax olefins by a process which comprises dissolving 93 to 99% by weight of the crude glycols on an oil-free basis in a hydrocarbon liquid, separating the undissolved portion of the crude glycols from the solution, and recovering the desired glycols from the solution.

By the process of the present invention it is possible to eliminate substantially all of the disadvantages heretofore associated with the use of cracked petroleum waxes in the production of high molecular weight glycols for the preparation of surface-active agents. The glycols obtained in the process upon conversion to the corresponding sulfuric esters and salts thereof have vastly improved surface-active properties including higher wetting power, greater detergency, and more stable foam.

The process of this invention is adaptable to any crude glycol prepared from high molecular weight cracked petroleum wax olefins. Olefins containing at least 8 carbon atoms produced by the cracking of petroleum wax are contemplated by the expression "high molecular weight cracked petroleum wax olefins." Crude glycols derived from olefins obtained by the thermal cracking of petroleum waxes are particularly desirable as starting materials, since they give products which are highly suitable for conversion to superior detergents. Crude glycols which contain from about 12 to about 24 carbon atoms and, more particularly, from about 16 to about 22 carbon atoms are preferred.

The hydroxylation of the cracked wax olefins may be effected by any convenient means. The method of Swern et al., referred to above, is particularly suitable. In this method the mixed olefins are reacted with hydrogen peroxide in either formic or acetic acid to produce the mixed glycols.

The glycol mixtures prepared by the hydroxylation of high molecular weight cracked petroleum wax olefins usually contain a hydrocarbon oil fraction of unreacted olefins and inert paraffins. These oil impurities may be removed by deoiling, as, for example, by absorption with an oil medium or extraction with a solvent. The term "deoiling" is employed in its conventional sense and means to remove the oil from the glycols. This may be done either before or after the treatment of the crude glycols in accordance with the invention. In a preferred embodiment the glycols are deoiled with the hydrocarbon liquid used to dissolve the crude glycols. The desired glycols are precipitated by evaporating and/or cooling the solution and separated by filtration or other means for separating solids from liquids. The oil impurities are retained in the hydrocarbon liquid which may be recovered for further use by fractional distillation or other suitable methods known to the art.

In accordance with the invention the crude glycols may be dissolved in any hydrocarbon liquid. In a preferred class of hydrocarbon liquids are those boiling substantially entirely below about 150° C., since they are particularly adaptable to separation procedures involving fractional distillation or precipitation by cooling and/or evaporation as mentioned heretofore. Specific examples of such hydrocarbon liquids include pentanes, hexanes, benzene, heptanes, toluene, octanes, xylenes, and mixtures thereof. Mixtures of liquid hydrocarbons in the form of distillates such as petroleum ether and petroleum naphtha solvents are also very suitable.

The liquid hydrocarbon is employed in amounts sufficient to dissolve from 93 to 99% by weight of the crude glycols, as already mentioned. In preferred practice about 95% by weight is dissolved. Since the glycol mixture as produced by the hydroxylation reaction ordinarily contains some contaminating hydrocarbon oil in varying amounts, the foregoing proportions are calculated on an oil-free basis.

If desired, the above separation may be accomplished by alternate methods. The crude glycols may be entirely dissolved in the hydrocarbon liquid and the solution then cooled to precipitate 1 to 7%, and preferably about 5% by weight of solid based on the oil-free crude glycols. The same effect may also be accomplished by dissolving all of the crude glycol in the hydrocarbon liquid and then evaporating sufficient of the hydrocarbon liquid to precipitate the desired amount of solid.

The separations of the undissolved crude glycols and precipitated glycols from the solutions as described above are conveniently carried out by any of the commercially known methods of separating solids from liquids. Such methods may involve sedimentation including the use of continuous rotating thickeners and centrifuges. For present purposes sedimentation with vacuum or centrifuge has been found to be a very practical means of separation. Decantation may also be employed if complete phase separation is not desired.

The process of the invention may be carried out at either atmospheric, subatmospheric or superatmospheric pressures. The temperatures at which the separations are to be effected have as their lower limit the freezing point of the solvent and as their upper limit the boiling point of the solvent. Atmospheric pressure is preferred since it avoids the use of expensive pressure equipment, and moderate temperatures, that is, room temperature or temperatures of 15 to 25° C., are considered desirable since they do not require extensive heating or cooling. Temperatures in the range from about 10 to about 80° C. are particularly suitable for the separation.

The following example is submitted in further illustration of the invention. Unless otherwise specified, the proportions given are on a weight basis.

Thermally cracked petroleum wax olefins boiling in the range from 40 to 116° C. at 5 mm. pressure and having an average molecular weight corresponding to 13 carbon atoms were converted to a crude mixture of glycols by means of peracetic acid followed by saponification. The resulting crude mixture of glycols contaminated by an oily hydrocarbon fraction of unreacted olefins and inert paraffins was dried to a pasty consistency and then heated to about 60° C. to give a clear liquid. The clear liquid was diluted to about 4 liters with isopentane and cooled to about −20° C. to precipitate the glycols. The mixture thus produced was filtered to give the deoiled crude glycols in the form of a white crystalline powder.

245 parts by weight of the above deoiled crude glycols were dissolved in about 1700 parts by weight of boiling benzene. The solution thus obtained was cooled to about 20° C. and a crystalline precipitate was formed. The mixture was then filtered to give 11 parts by weight of a water-soluble, colorless crystalline solid having a melting point of 123° C.

The filtrate from the above example was evaporated to remove the benzene solvent. 234 parts by weight of mixed glycols were thus obtained in the form of a white crystalline powder having a melting point of 50–60° C.

In a further embodiment of the invention, the production of improved glycols from crude glycols prepared by the hydroxylation of high molecular weight cracked petroleum wax olefins is carried out in a continuous process. In this process the crude glycols are subjected to a series of separations in which hydrocarbon impurities such as unreacted olefins and inert paraffins are removed as well as the glycol contaminants by a single hydrocarbon liquid solvent which is recovered and recycled to the process.

Referring to the drawing, the crude glycols containing hydrocarbon impurities such as unreacted olefins and inert paraffins are introduced via line 11 and the hydrocarbon liquid solvent via line 12 into vessel 13 wherein they are intimately mixed. Sufficient solvent to dissolve 93 to 99% by weight of the crude glycols on an oil-free basis is employed. The mixture of solution and undissolved solid thus formed are withdrawn through line 14 to separator 16, from which the undissolved solid is taken via line 17 and the solution via line 18. The undissolved solid impurities from line 17 may be discarded or subjected to further processing as desired.

The solution from line 18 is passed into vessel 19 wherein it is cooled by means of cooler 21 and mixed to form a solid phase and a liquid phase in intimate mixture. The mixture thus formed is withdrawn via line 22 to separator 23 from which the solid phase is taken at line 24 and the liquid phase at line 26. The solid phase from line 24 is passed through drier 27 and the dried glycol product is withdrawn at line 28. The liquid phase from line 26 containing hydrocarbon liquid solvent and hydrocarbon impurities from the crude glycol mixture is passed into fractionator 29. In fractionator 29 the hydrocarbon liquid solvent is separated from the hydrocarbon impurities and returned via line 31 to the process. The hydrocarbon impurities consisting of unreacted olefins, inert paraffins, etc. are withdrawn through line 32 and may be discarded or subjected to further treatment in the production of the high molecular weight glycols.

The advantages of the process according to this invention may be illustrated by a comparison of the cotton laundering detergency of (1) a 1,2-glycol sulfate produced from a $C_{13}$ glycol free of contaminants usually found in cracked wax glycols, and (2) a 1,2-glycol sulfate produced from a crude deoiled glycol prepared by the hydroxylation of a high molecular weight cracked petroleum wax olefin mixture containing an average of 18 carbon atoms per molecule. On the basis of a soap index of 100, the detergent composition containing the former as its active ingredient was found to have an index of 74, while a similar detergent composition containing the latter had an index of only 54.

I claim:

1. A process for producing improved glycols from crude glycols prepared by the hydroxylation of high molecular weight cracked petroleum wax olefins having 8 to 24 carbon atoms in the molecule, which comprises dissolving 93 to 99% by weight of the crude glycols on an oil-free basis in a hydrocarbon liquid boiling below about 150° C., separating the undissolved portion of the crude glycols from the solution and recovering the desired glycols from the solution.

2. The process for producing improved glycols from crude glycols prepared by the hydroxylation of high molecular weight cracked petroleum wax olefins containing an average of 12 to 24 carbon atoms per molecule which comprises dissolving 93 to 99% by weight of the crude glycols on an oil-free basis in a hydrocarbon liquid boiling below about 150° C., separating the undissolved portion of the crude glycols from the solution and recovering the desired glycols from the solution.

3. A process for producing improved glycols from crude glycols prepared by the hydroxylation of high molecular weight cracked petroleum wax olefins containing an average of 16 to 22 carbon atoms per molecule which comprises dissolving 93 to 99% by weight of the crude glycols on an oil-free basis in a hydrocarbon liquid boiling below about 150° C., separating the undissolved portion of the crude glycols from the solution and recovering the desired glycols from the solution.

4. A process for producing improved glycols from crude glycols prepared by the hydroxylation of a mixture of thermally cracked petroleum wax olefins containing 16 to 22 carbon atoms and an average of about 18 carbon atoms per molecule which comprises dissolving about 95% by weight of the crude glycols on an oil-free basis in a hydrocarbon liquid boiling below about 150° C., separating the undissolved portion of the crude glycols from the solution and recovering the desired glycols from the solution.

5. A process as described in claim 4, wherein the hydrocarbon liquid is benzene.

6. A process as described in claim 4, wherein the hydrocarbon liquid is isopentane.

7. A process for producing improved glycols from crude glycols prepared by the hydroxylation of high molecular weight cracked petroleum wax olefins containing 8 to 24 carbon atoms per molecule, which comprises dissolving 93 to 99% by weight of the crude glycols on an oil-free basis in a hydrocarbon liquid boiling below about 150° C., separating the undissolved portion of the crude glycols from the solution, precipitating the desired glycols from the solution and separating the precipitate thus formed.

8. A process for producing improved glycols from crude glycols prepared by the hydroxylation of high molecular weight cracked petroleum wax olefins containing 8 to 24 carbon atoms in the molecule, which comprises dissolving 93 to 99% by weight of the crude glycols on an oil-free basis in a hydrocarbon liquid boiling below about 150° C., separating the undissolved portion of the crude glycols from the solution, cooling the solution to precipitate the desired glycols and separating the precipitate thus formed.

9. A process for producing improved glycols from crude glycols prepared by the hydroxylation of high molecular weight cracked petroleum wax olefins containing 8 to 24 carbon atoms per molecule, which comprises dissolving 93 to 99% of the crude glycols on an oil-free basis in a hydrocarbon liquid boiling below about 150° C., separating the undissolved portion of the crude glycols from the solution, evaporating the solution to precipitate the desired glycols and separating the precipitate thus formed.

10. A process for producing improved glycols from crude glycols prepared by the hydroxylation of high molecular weight cracked petroleum wax olefins containing 8 to 24 carbon atoms per molecule, which comprises dissolving 93 to 99% by weight of the crude glycols on an oil-free basis in a hydrocarbon liquid boiling below about 150° C., separating the undissolved portion of the crude glycols from the solution, recovering the desired glycols from the solution, separating the hydrocarbon liquid from the solution and recycling the hydrocarbon liquid to the process.

References Cited in the file of this patent

UNITED STATES PATENTS

| | | |
|---|---|---|
| 2,487,610 | Sprules et al. | Nov. 8, 1949 |
| 2,510,905 | Raczynski | June 6, 1950 |
| 2,566,986 | Green et al. | Sept. 4, 1951 |

OTHER REFERENCES

Swern et al.: Journal of the American Chem. Soc., vol. 68, pp. 1504 to 1507.

Barnett: The Preparation of Organic Compounds, 2nd ed., published by J. & A. Churchill, London, 1920, pp. 16 and 17.

James F. Norris: Experimental Organic Chemistry, McGraw-Hill, N. Y., 1924, pp. 3–5.

R. S. Tipson: Techniques of Organic Chemistry, vol. III, Interscience, New York, 1950; pp. 420–8.